United States Patent [19]
Dismukes et al.

[11] Patent Number: 5,852,088
[45] Date of Patent: Dec. 22, 1998

[54] NANOPOROUS CERAMICS WITH CATALYTIC FUNCTIONALITY

[75] Inventors: John P. Dismukes, Annandale; Jack Wayne Johnson, Clinton, both of N.J.; John Stewart Bradley, Anderruhr, Germany

[73] Assignee: Exxon Research and Engineering Company, Florham Park, N.J.

[21] Appl. No.: 578,084

[22] Filed: Dec. 27, 1995

[51] Int. Cl.$^6$ ....................................................... C08K 5/00
[52] U.S. Cl. ........................... 524/175; 523/200; 501/88; 501/89; 501/91; 501/92; 501/93; 524/176; 524/177; 524/178; 524/356; 524/357; 524/445; 524/398; 524/399; 524/400
[58] Field of Search ................................. 501/88, 89, 91, 501/92, 93; 524/175, 178, 176, 177, 356, 357, 445, 398, 399, 400; 523/200

[56] References Cited

U.S. PATENT DOCUMENTS

| | | | |
|---|---|---|---|
| 4,833,107 | 5/1989 | Kaya et al. | 501/97 |
| 4,835,207 | 5/1989 | Semen et al. | 524/443 |
| 4,857,492 | 8/1989 | Bradley et al. | 502/17 |
| 4,891,340 | 1/1990 | Semen et al. | 501/88 |
| 4,937,304 | 6/1990 | Ayama et al. | 528/34 |
| 4,942,145 | 7/1990 | Moehle et al. | 501/90 |
| 4,950,381 | 8/1990 | Takeuchi et al. | 528/10 |
| 5,006,492 | 4/1991 | Semen et al. | 501/97 |

FOREIGN PATENT DOCUMENTS

| | | |
|---|---|---|
| 0 200 326 A1 | 12/1986 | European Pat. Off. . |
| 0 331 424 A1 | 9/1989 | European Pat. Off. . |
| 0 376 183 A1 | 7/1990 | European Pat. Off. . |
| 0 389 084 | 9/1990 | European Pat. Off. . |

OTHER PUBLICATIONS

Ceramics From Organometallic Polymers, Peuckert et al, 1990, 398–404.

Pyrolysis Chemistry of Poly(organosilazanes) to Silicon Ceramics, Han et al, Feb. 24, 1992, 705–711.

A method of the determination of the pore size distribution of molecular sieve materials and its application to the characterization of partially pyrolyzed polysilastyrene/porous glass composite membranes, Grosgogeat et al, Journal of Membrane Science, 57 (1991) 237–255.

*Primary Examiner*—Melvyn I. Marquis
*Attorney, Agent, or Firm*—Jay Simon

[57] ABSTRACT

The present invention provides for amorphous, nanoporous, catalytic metal-containing ceramic material having a surface area in excess of 70 $m^2$/gm and characterized by a high content of open microporous cell structure wherein the micropores have a mean width of less than 20 Angstroms and wherein said microporous structure comprises a volume of greater than about 0.03 $cm^3$/gm of the ceramic. The invention also provides for a preceramic composite intermediate composition comprising a mixture of a ceramic precursor and from about 0.5 up to about 65 wt % of an organometallic compound containing a metal of Group IB, II, III, IV, IV, V, VIB, VIIA or VIII of the Periodic Table, including rare earth metals, whose pyrolysis product in ammonia or an inert atmosphere at temperatures of up to less than about 1100° C. gives rise to the nanoporous catalytic ceramics of the invention. Also provided is a process for the preparation of the nanoporous ceramics of the invention involving pyrolysis of the ceramic intermediate under controlled conditions of heating up to temperatures of less than about 1100° C. to form a nanoporous ceramic product useful in catalytic and membrane separation processes.

44 Claims, No Drawings

NANOPOROUS CERAMICS WITH CATALYTIC FUNCTIONALITY

BACKGROUND OF THE INVENTION

1. Field of the Invention

The present invention relates to open pore, nanoporous ceramic materials having catalytic functionality and their method of manufacture.

2. Description of Related Art

Porous materials play a particularly important role in a number of chemical processing industries and applications. Separations based on membranes are critical in such fields as chemical recovery, purification and dehumidification. Porous oxides (e.g. clays, silica, alumina and zeolite) are the materials of choice as catalysts or catalyst supports in chemical and petroleum processing reactions such as hydrocracking, hydrodesulfurization, reforming, and polymerization.

With respect to membrane technology, inorganic membranes offer a number of advantages over polymeric membranes which are typically limited to uses at temperatures below about 250° C. These include: i) higher operating temperatures, ii) greater structural integrity and hence the ability to withstand higher pressure differentials and back-flushing and iii) improved resistance to corrosion. Porous oxide, (e.g. aluminum oxide) and carbon membranes offer some of these characteristics, but advanced materials are still required for improved strength, toughness, structural integrity, temperature stability, water and oxygen resistance, thermal shock resistance, molecular selectivity to small molecules and gases, and high flux.

Similar considerations apply to clay and metal oxide type catalysts or catalyst supports, particularly as relates to stability and thermal shock resistance at temperatures above about 500° C.

Ceramic materials of the Si—C, Si—N, Si—C—N, Si—B—C, Si—B—N, Al—N, Si—Al—N, B—Al—N and related types appear to offer many of the properties set forth above. However, the sol-gel synthesis methods typically used to prepare porous oxide membranes or catalyst supports are incompatible with the preparation of ceramics of the type described above because of the need to use water in their preparation. Sintering or reactive sintering of these ceramics likewise produces materials with pore sizes of from about 0.1 to about 1000 microns which are non-uniform and generally too large for effective molecular separation and other uses described above. Chemical vapor deposition can produce microporous ceramic layers, but this tends to be an expensive, high temperature process with limited ability to tailor complex ceramic compositions.

Recently, researchers have discovered improved methods for preparing ceramics using ceramic precursors as starting materials. A ceramic precursor is a material, either a chemical compound, oligomer or polymer, which upon pyrolysis in an inert atmosphere and at high temperatures e.g. above about 700°–1000° C., preferably above 1000° C., will undergo cleavage of chemical bonds liberating such species as hydrogen, organic compounds, and the like, depending upon the maximum pyrolysis temperature. The resulting decomposition product is typically an amorphous ceramic containing Si—C bonds (silicon carbide), Si—N bonds (silicon nitride) or other bond structures which will vary as a function of the identity of the ceramic precursor, e.g. Si—C—N, Si—N—B, B—N, Al—N and other bond structures, as well as combinations of these structures. Crystallization of these amorphous ceramic products usually requires even higher temperatures in the range of 1200°–1600° C.

The pyrolysis of various ceramic precursors, e.g. polycarbosilanes, polysilanes, polycarbosiloxanes, polysilazanes, and like materials at temperatures of 1300° C. and higher to produce ceramic products, e.g. silicon carbide and/or silicon nitride, is disclosed, for example, in M. Peuckert et al., "Ceramics from Organometallic Polymers", Adv. Mater.2, 398–404 (1990). The pyrolysis of polyorganosilazanes under ammonia atmosphere at pyrolysis temperatures up to 1400° C. is also disclosed in Han et al., "Pyrolysis Chemistry of Poly(organosilazanes) to Silicon Ceramics", Chem. Mater., Vol. 4, No. 3, pp. 705–711 (1992).

During pyrolysis, preceramic precursors such as described above liberate various gaseous decomposition species such as hydrogen and organic compounds, including methane, higher molecular weight hydrocarbon molecules, lower molecular weight precursor fragments and H—C—N species. These gases tend to coalesce within the preceramic matrix as they form, resulting in a bulking or swelling of the mass. These entrained gases can lead to the formation of gas bubbles within the developing ceramic mass as the preceramic precursor crosslinks and hardens, resulting in a lower density ceramic having a voluminous, macroporous or mesoporous closed-cell structure, without development of a significant amount of open celled micropores.

Where dense, non-porous ceramic materials are sought using ceramic precursors yielding high gas volumes, it is often necessary to conduct the pyrolysis over a very long period of time with very gradual incremental temperature increases and/or under vacuum to assist in removal of these gaseous species at temperatures where they are formed.

In copending applications Ser. No. 08/248,290, U.S. Pat. No. 5,643,987, and Ser. No. 08/248,291, U.S. Pat. No. 5,563,212, each filed in the United States on May 24, 1994, it is disclosed that microporous ceramics can be achieved by the pyrolysis of a preceramic intermediate composition based on an intimate mixture of from about 30 to 99 parts by weight of a preceramic precursor polymer or oligomer and correspondingly from about 1 to 70 parts by weight of a particulate material having a particle size of less than 10 microns. In this process, pyrolysis is conducted at temperatures of up to less than about 1200° C. under flowing inert gas such as helium, argon or nitrogen, or under ammonia gas. Those inventions were based on the discovery that the presence of a particulate filler in the preceramic matrix served to prevent nucleation of large bubbles of decomposition gases as they were generated during decomposition under inert or ammonia gas, thereby yielding a microporous structure in the pyrolyzed product rather than a voluminous, macroporous mass of low bulk density which was achieved where pyrolysis was conducted under inert gas and the particulate material was not present in the precursor.

Also, copending application Ser. No. 08/385,299, filed Feb. 10, 1995, U.S. Pat. No. 5,696,217 as a continuation-in-part of application Ser. No. 08/248,289, filed May 24, 1994, abandoned, discloses that microporous ceramics can be achieved without the need to include particulate material in the pre-ceramic composition by conducting the pyrolysis at a controlled rate of heating and under flowing ammonia gas and at maximum heating temperatures of less than 1200° C., preferably less than 1000° C.

In copending application Ser. No. 08/579,444, filed on Dec. 27, 1995, microporous ceramic materials are disclosed which are prepared by first forming a composite intermediate comprising a colloidal dispersion of a preceramic precursor polymer mixed with discrete, nanoscale metal particles having a dimension of from about 10 to about 500 Angstroms and gradually heating the mixture in the presence of an inert or reactive gas to a temperature of about 300° C. up to less than 1100° C. to achieve a microporous ceramic having a surface area in excess of 70 m$^2$/gm and a volume of open pore micropores of greater than about 0.03 cm$^3$/gm. The metal particles in this application appear to serve to prevent nucleation of large bubbles of decomposition gas during pyrolysis, analogous to the function of the particulate filler in the above mentioned patent application Ser. Nos. 08/248,290 and 08/248,291.

Where microporous ceramic materials such as described above or clay aluminosilicates or zeolites are intended for use as catalyst supports, it is necessary in many applications to impregnate the support with one or more finely dispersed metals which serve to promote the particular catalytic reaction desired. In the case of zeolite or aluminosilicate clay supports, impregnation can be readily carried out by ion exchange or impregnation reactions with a salt of the desired metal cation, e.g., by contact of the support with an acidic halide, sulfate or nitrate salt solution of a rare earth metal or, e.g., a Group IIA, IIIA, IVA, IB, IIB, IIIB, IVB, VIB and VIII metal of the Periodic Table, such as platinum or palladium. However, such methods to not work well with crosslinked ceramic materials because of differences in chemistry between the ceramics and the clay/zeolite materials.

SUMMARY OF THE INVENTION

The present invention provides for amorphous, nanoporous, catalytic metal-containing ceramic materials having a surface area in excess of 70 m$^2$/gm, preferably in excess of 100 m$^2$/gm, and characterized by a high content of open-pore microporous cell structure wherein the micropores have a mean width (diameter) of less than 20 Angstroms and wherein said microporous structure comprises a volume of greater than about 0.03 cm$^3$/gm, preferably greater than 0.05 cm$^3$/gm, of the ceramic. The invention also provides for a preceramic composite intermediate composition comprising a mixture of a ceramic precursor polymer or oligomer, and from about 0.5 up to about 65 wt % of an organometallic compound containing a metal of Group IB, II, III, IV, V, VIB, VIIA or VIII of the Periodic Table, including rare earth metals, whose pyrolysis product in inert atmosphere or in an ammonia atmosphere at temperatures of up to less than about 1200° C. gives rise to the nanoporous catalytic ceramics of the invention. Also provided is a process for preparation of the microporous ceramics of the invention comprising: a) forming a composite intermediate composition comprising an intimate mixture of ceramic precursor polymer or oligomer having number average molecular weight in the range of from about 200 to about 100,000 g/mole and from about 0.5 to about 65% by weight % of an organometallic compound containing a metal of Group IB, II, III, IV, V, VIB, VIIA, or VIII of the Periodic Table uniformly dispersed therein, b) gradually heating said mixture in the presence of an inert gas or ammonia gas, and in optional sequential stages with hold times at intermediate temperatures, to a maximum temperature in the range of from about 300° C. up to less than about 1100° C. and over a period of total heating and hold time of from about 3 to about 50 hours to form a nanoporous ceramic product, and c) gradually cooling said nanoporous ceramic product.

The nanoporous ceramics prepared in accordance with this invention generally exhibit a surface area within the range of from about 70, preferably at least 100 and more preferably at least 200 up to about 500 m$^2$/gm based on the combined weight of amorphous phase and catalytic metal, and amorphous phase micropore volumes of greater than 0.03 up to about 0.26 cm$^3$g, wherein the volume fraction of micropores in the ceramic product ranges from about 8% to about 36%.

Ceramics produced in accordance with this invention are particularly useful as active layers in membrane separation structures and as catalyst supports.

DETAILED DESCRIPTION OF THE INVENTION

The term "nanoporous" as used herein refers to open pore, crosslinked ceramics having a porous structure wherein the pores have a mean width (diameter) of up to about 100 Angstroms. Inclusive within this definition are microporous ceramic structures having pores of mean width of about 2 to 20 Angstroms as well as supermicroporous ceramic structures with pore sizes of from above 20 up to 100 Angstroms. These terms are to be distinguished from the terms "mesoporous" which refers to pores having a mean width of up to about 500 Angstroms and "macroporous" which refers to pores having a mean width of 500 Angstroms or greater.

Nanoporous materials having a surface area in excess of 70 m$^2$/gram will also have a significant content of microporous, open pore structure, e.g., greater than 0.03 cm$^3$/gm of product and more preferably greater than 0.05 cm$^3$/gm. A high content of microporous structure is indicative of a high content of nanoporous structure having a pore width averaging less than 100 Angstroms.

The surface area and micropore volume are calculated from the nitrogen adsorption isotherm, which is measured at 77°K using an automated continuous flow apparatus. The total surface area is calculated using the BET method, and the micropore volume and mesopore/macropore surface area are calculated using the T-plot method, as described in S.J. Gregg and K. S. W. Sing, "Adsorption, Surface Area and Porosity", Academic Press, New York, 1982; and S. Lowell and J. F. Shields, "Powder Surface Area and Porosity", Chapman and Hall, New York, 3rd Edition, 1984. Subtraction of the mesopore/macropore surface area from the total surface area gives an estimate of the micropore surface area and a further estimate of the nanoporous surface area.

Ceramic precursor materials which are preferred for the purposes of this invention include oligomers and polymers such as polysilazanes, polycarbosilazanes, polycarbosilanes, vinylic polysilanes, amine boranes, polyphenylborazanes, carboranesiloxanes, polysilastyrene, polytitanocarbosilanes and like materials, as well as mixtures thereof, whose pyrolysis products yield ceramic compositions containing structural units having bond linkages selected from Si—C, Si—N, Si—C—N, Si—B, Si—B—N, Si—B—C, Si—C—N—B, B—N and B—N—C, as well as oxycarbide and oxynitride bond linkages such as Si—O—N and Ti—O—C. The preferred precursors are those oligomers and polymers having a number average molecular weight in the range of from about 200 to about 100,000 g/mole, more preferably from about 400 to about 20,000 g/mole. The chemistry of these oligomeric and polymeric precursors is further disclosed in the monograph "Inorganic Polymers", J. E. Mark, H. R. Allcock, and R. West, Prentice Hall, 1992.

Particularly preferred polysilazanes are those materials disclosed in U.S. Pat. Nos. 4,937,304 and 4,950,381, the complete disclosures of which are incorporated herein by reference. These materials contain, for example, recurring —Si(H)(CH$_3$)—NH— and —Si(CH$_3$)$_2$—NH— units and are prepared by reacting one or a mixture of monomers having the formula R$_1$SiHX$_2$ and R$_2$R$_3$SiX$_2$ in anhydrous solvent with ammonia. In the above formulas, R$_1$, R$_2$ and R$_3$ may be the same or different groups selected from hydrocarbyl, alkyl silyl or alkylamino and X$_2$ is halogen. The preferred polysilazanes are prepared using methyldichlorosilane or a mixture of methyldichlorosilane and dimethyldichlorosilane as monomer reactants with ammonia. The primary high temperature pyrolysis products (>1300° C.) of this precursor are silicon nitride (Si$_3$N$_4$) and silicon carbide (SiC). These precursors are commercially available from Chisso Corporation, Japan under the trade designations NCP-100 and NCP-200, and have a number average molecular weight of about 6300 and 1300 respectively.

Another class of polysilazane precursors are polyorgano (hydro) silazanes having units of the structure $[(RSiHNH)_x (R_1SiH)_{1.5}N]_{1-x}$ where R$_1$ is the same or different hydrocarbyl, alkylsilyl, alkylamino or alkoxy and 0.4<X<1. These materials are disclosed in U.S. Pat. No. 4,659,850, the complete disclosure of which is incorporated herein by reference.

Another preferred ceramic precursor is a polysilastyrene having the structure $[-(phenyl)(methyl) Si—Si (methyl)_2-]_n$ available under the trade designation "Polysilastyrene-120" from Nippon Soda, Japan. This material has a number average molecular weight of about 2000 and the primary pyrolysis products of this precursor in an inert atmosphere are silicon carbide and carbon.

Other preferred ceramic precursors are polycarbosilanes having units of the structure $(Si(CH_3)_2CH_2)_n$ and/or $(SiH(CH_3)CH_2)_n$ having a number average molecular weight in the range of about 1000 to 7000. Suitable polycarbosilanes are available from Dow Corning under the trade designation PC-X9-6348 (Mn=1420 g/mol) and from Nippon Carbon of Japan under the trade designation PC-X9-6348 (Mn=1420 g/mol). The main pyrolysis product of these materials (>1300° C.) in an inert atmosphere are silicon carbide and excess carbon.

Vinylic polysilanes useful in this invention are available from Union Carbide Corporation under the trade designation Y-12044. These yield silicon carbide together with excess carbon as the main pyrolysis products in an inert atmosphere at elevated temperatures (>1300° C.).

Other suitable preceramic precursors will be evident to those skilled in the art, particularly those yielding SiC, Si$_3$N$_4$, Si—C—N, BN,Si—B—N, B$_4$C—BN—C and Si—B—C as pyrolysis products.

The nanoporous catalytic ceramics of the present invention are prepared by first forming a preceramic composite intermediate composition comprising a mixture of the ceramic precursor oligomer or polymer and from about 0.5 up to about 65 wt % of an organometallic compound containing a metal of Group IB, II, III, IV, V, VIB, VIIA or VIII of the Periodic Table. The term "organometallic" compound as used herein refers to compounds, complexes, chelates and the like containing both metallic and organic moieties. Preferably, the composite intermediate contains from about 1 to about 35 wt %, more preferably from about 5 to 25 wt % of the organometallic compound. The selection of any particular metal compound will depend on the type of catalytic functionality desired, e.g., alkylation, hydrogenation, hydrocracking, hydrosulfurization, disproportionation, reforming, polymerization or the like. Metals most useful for these types of catalytic action are well known to those skilled in the art and include transition metals, noble and rare earth metals, and more particularly metals such as aluminum, nickel, iron, molybdenum, rhenium, platinum and palladium.

One preferred class of metals includes Pt, Pd, Rh, Re, Ru, Fe, Ni, Cu, Co, Ag, Al and Ga. Another preferred class of metals includes Ti, Zr, Hf, V, Nb, Ta, Cr, Mo, W, Y and the rare earth metals, e.g., Ce, La, Sm, Eu, Gd, Yb, Tm and the like.

To form a composite intermediate, these metals are mixed with the ceramic precursor material in the form of organometallic compounds such as a metal carbonyl, metal salts of organic or inorganic acids, metal chelates with organic ligands or metal-containing polymers such as aluminoxanes or polyalazanes. Suitable such organometallic compounds include metal chelates of beta-diketones such as acetylacetone (HAcAc), e.g. Cu(AcAc)$_2$, Fe(AcAc)$_3$, Mg(AcAc)$_2$, Zr(AcAc)$_2$, Al(AcAc)$_3$, Co(AcAc)$_3$, Ni(AcAc)$_2$, Vo(AcAc)$_2$, V(AcAc)$_3$, Pt(AcAc)$_2$ and rare earth metal chelates of beta-diketones. Other metal chelating beta-diketones include tetraalkylheptanediones, e.g., tetramethylheptanedione H(tmhd), e.g., metal complexes such as La (tmhd)$_3$ Ce (tmhd)$_4$, Yb (tmhd)$_3$ and like compounds. Other organometallic compounds which may be used include acid salts such as Fe (CpCO$_2$H)$_2$ (cyclopentadiene carboxylic acid salt) and metal carbonyls such as Mo(CO)$_6$ and W(CO)$_6$. Still other organometallic compounds which may be used include organic solvent dispersible metal silicate-containing clays such as a tetra-ammonium alkyl exchanged clay (synthetic hectorite) available from Southern Clay Products, Inc. Mixtures of two or more of said organometallic compounds may also be used.

Mixing may be accomplished by any process which will ensure a uniform dispersion of the organometallic compound in the ceramic precursor matrix. Thus the components may be ground, ball milled or pulverized together in dry form to form a fine powder mixture, or mixed in dry form and heated to a temperature of up to about 200°–250° C. to form a melt mixture, which melt mixture may then be cooled and pulverized. The melt may also be used directly to form molded shapes or membrane films which are then pyrolyzed as hereafter described to form ceramic shaped articles. Alternatively, the precursor oligomer or polymer and the organometallic compound may be dissolved in an organic solvent in which both components are soluble, e.g., toluene or xylene, followed by removal of the solvent by evaporation and grinding the resultant dry product into a fine powder. The solvent solution may also be used directly to form shaped articles by permitting it to gel into a shaped form or by application to substrates and evaporation of the solvent to form a thin film or membrane.

Prior to pyrolysis, the composite intermediate is formed into any desired shape such as a pellet, disc, fiber, thin membrane, membrane layer or other three dimensional shape. The dry precursor may be shaped using an extruder or a hydraulic press, with or without heat being applied, or by conducting the pyrolysis in a suitable mold cavity containing the composite intermediate. Fibers may be prepared by extruding or spinning a melt or solution of the composite intermediate. Pellets may be formed by chopping the fibers as they emerge from the extruder or spinning die. Thin separation membranes may be formed by applying a melt or solution of the composite intermediate to the surface of a suitable substrate, such as another ceramic, and subjecting the structure to well known spin or whirl coating techniques to form a uniform, thin coating of the precursor on the surface of the substrate, followed by heating to evaporate off the solvent where solvent is present.

In addition to the organometallic compound, the composite intermediate may also contain one or a mixture of particulate materials which promote the formation of micro- and nano-porosity in the ceramic during pyrolysis, particularly when pyrolysis is conducted in the presence of flowing inert gas such as helium, argon or nitrogen. For example, the precursor may also be mixed with up to 50 wt % of ceramic particles such as silicon carbide, silicon nitride, silicon-carbide-nitride and mixtures thereof having a mean particle size of less than about 10 microns, as disclosed in the aforementioned U.S. patent application Ser. No. 08/248,290. Other particles which may be mixed with ceramic precursor include non-silicon containing particles also having a mean particle size of less than 10 microns, such as carbon, alumina, aluminosilicates or nitrides or carbides of metals such as aluminum, boron, molybdenum, manganese, titanium, zirconium or tungsten and mixtures thereof, present at a level of up to about 60 wt %, as disclosed in the aforementioned U.S. patent application Ser. No. 08/248,291. Other particles which promote the development of a nanoporous structure include solid metal particles having a mean particle size of from about 10 to about 100 Angstroms present in the preceramic intermediate at a level of up to 35 wt %, as disclosed in copending application Ser. No. 579,444.

As indicated above, pyrolysis of the composite intermediate is next conducted by heating it under flowing gas, e.g. argon, helium or nitrogen, or under flowing ammonia gas, at a controlled rate of temperature, with preferred hold times at intermediate temperatures to maintain uniformity of the ceramic product, and a final hold time at the maximum heating temperature, followed by gradual cooling of the ceramic end product to room temperature. Generally speaking, microporous ceramics are formed by gradually heating the composite intermediate to a maximum temperature ($T_{max}$), in the range of from about 300° C. to less than about 1100° C. at a heating rate in the range of from about 1° C. to 10° C. per minute, with various holding times of about 0.5 to about 5 hours at selected temperatures between about 200° C. and $T_{max}$. Total combined heating/holding times may range from about 3 to about 50 hours, more preferably from about 5 to about 24 hours. Holding times and temperatures are dictated by ceramic precursor decomposition and reaction kinetics. Hence, they depend on precursor composition and the rate of evolution of specific molecular species at or about the holding temperature, e.g., $H_2$, $CH_4$, higher molecular weight hydrocarbon or H—C—N species, or ceramic precursor fragments as reflected by sample weight losses at or about these temperatures. The flow rate of the inert gas or ammonia gas may range from about 100 to about 1000 cc/min.

As indicated above, the pyrolysis may be carried out by continuous heating of the composite intermediate up to ($T_{max}$) or by sequential heating including hold times at intermediate temperatures below ($T_{max}$). As a general rule where the heating rate is slow, e.g., less than about 5° C./min. or 300° C. per hour, intermediate holding times below ($T_{max}$) may not be necessary in order to form the desired microporous structure. Where the heating rate is more intense, e.g., 5° C./min. or 300° C. per hour or higher, then holding times at one or more intermediate temperatures below ($T_{max}$) will generally be necessary to achieve the desired microporous structure.

In one embodiment of the invention, pyrolysis is carried out in a heat treating furnace or muffle oven using the following schedule and using flowing ammonia or flowing inert gas throughout:

i) after flushing the furnace with either an inert gas, e.g. helium or argon, or reactive gas such as ammonia, the temperature is first increased from about 25° C. to about 200°±25° C. over a period of 0.5 to 3 hours, held at that temperature for a period of 0.5 to 5 hours, preferably 1 to 2 hours and the temperature then increased;

ii) in the second step, the temperature is increased to $T_{max}$ or about 400°±25° C., whichever is less, over a time of from about 0.5 to 5 hours, preferably from 1 to 2 hours and held at that temperature for 0.5 to 5 hours, preferably 1 to 2 hours, and the temperature again increased;

iii) in the third step, where $T_{max}$ is above 400° C., the temperature is increased to $T_{max}$ or about 500°±25° C., whichever is less, over a time period up to about 5 hours, preferably up to 2 hours, and held at that temperature for 0.5 to 5 hours, preferably 1 to 2 hours;

iv) in a fourth step where $T_{max}$ is above 500° C., the temperature is increased to $T_{max}$ or about 700°±25° C., whichever is less, over a time period up to about 5 hours, preferably up to 2 hours, and held at that temperature for 0.5 to 5 hours, preferably 1 to 2 hours;

V) in a subsequent step where $T_{max}$ ranges between 700° C. and 1100° C., the temperature is increased to $T_{max}$ over a time period of up to 5 hours, preferably 1 to 3 hours, and held at $T_{max}$ for 0.05 to 5 hours, preferably 1 to 2 hours.

In the most preferred embodiment using the above heating schedule, the composite intermediate is heated as above with a 1 to 2 hour hold at about 200° C., 300° C., 500° and 700° C. (and $T_{max}$ if $T_{max}$ is greater than 700° C. and the pyrolyzed ceramic then allowed to return from $T_{max}$ to room temperature while continuing the flow of ammonia or inert gas during the cooling period.

In another embodiment of the invention, pyrolysis is conducted in the presence of a flowing reactive gas such as ammonia, since inert gases may not produce the desired microporosity with respect to all ceramic precursor materials. A preferred heating schedule for such an embodiment is as follows:

i) after flushing the furnace with ammonia gas, the temperature is first increased from about 25° C. to about 200°±25° C. over a period of 45 to 120 minutes, held at that temperature for a period of 1–6 hours, preferably 2–5 hours and the temperature then increased;

ii) in the second step, the temperature may be increased from about 200° C. to about 300°±25° C. over a time of from about 35 to 240 minutes, more preferably about 45 to 200 minutes, and held at that temperature for 1–6 hours, preferably 2–5 hours, and the temperature again increased;

iii) in the third step, the temperature may be increased from about 300° C. to 400°±25° C. over a time period of from about 35 to 240 minutes, more preferably from about 45 to 200 minutes and held at that temperature for 1–6 hours, more preferably from 2–5 hours, and the temperature again increased;

iv) in the fourth step the temperature is increased to $T_{max}$ or about 500°±25° C., whichever is less, over a time period of from about 35 to 240 minutes, more preferably from about 45 to 200 minutes and held at that temperature for 1–6 hours, more preferably from 2–5 hours;

v) in a fifth step where $T_{max}$ is above 500° C., the temperature is increased to $T_{max}$ or about 700°±25° C., whichever is less, over a time period of from about 35 to about 240 minutes, more preferably from about 45 to 200 minutes, and held at that temperature for 1–6 hours, preferably 2–5 hours;

vi) in a subsequent step where $T_{max}$ ranges between 700° C. and 1100° C., the temperature is increased to $T_{max}$ over a time period of up to 5 hours, preferably 1–3 hours, and held at $T_{max}$ for 1–6 hours, preferably 2–5 hours.

In the most preferred embodiment using the above heating schedule and ammonia gas, the precursor is heated as above with a 1 to 5 hour hold at about 200° C., 300° C., 400° C., 500° C. and 700° C. (and $T_{max}$ if $T_{max}$ is greater than 700° C., and the pyrolyzed ceramic then allowed to return from $T_{max}$ to room temperature while continuing the flow of ammonia during the cooling period. The time of cooling may range from about 1 to 8 hours. Best results in terms of the development of porosity in this heating schedule are achieved where the rate of temperature increase between 300° C. to 600° C., or between 300° C. and $T_{max}$ if $T_{max}$ is less than 600° C., is less than about 5° C./min., and wherein at least two holding periods of 1 to 6 hours are conducted between 200° C. and 600° C. or $T_{max}$ if $T_{max}$ is less than 600° C.

A factor which influences the surface area and degree of microporosity is the maximum temperature ($T_{max}$) to which the ceramic is heated. Generally speaking, microporosity disappears or is diminished when $T_{max}$ is above about 1100° C. For most preceramic polymers, the degree of microporosity tends to be at maximum levels for $T_{max}$ between about 400° C. and 1100° C., more particularly at about 700°±200° C.

Ceramic precursor polymers pyrolyzed in accordance with this invention generally exhibit a post-pyrolysis ceramic yield of at least about 50% by weight of the weight of the starting precursor, more preferably at least 55% by weight.

Incorporation of catalytic functionalities at the atomic or nanoscale level into nanoporous matrices, particularly silicon carbide and silicon nitride matrices, in accordance with this invention provides a new class of materials for use as catalysts and catalytic membranes. These materials are thermally and hydrolytically stable and shock resistant and particularly useful for solvent, catalyst and membrane/catalytic membrane applications.

The post-pyrolysis ceramics will generally contain from about 0.1 up to about 10% by weight, more preferably from about 0.3 up to about 8% by weight of the catalytic metal.

The following examples are illustrative of the invention. As used in the examples and tables, the following designations have the following meanings:

NCP-100—A polysilazane polymer available from the Chisso Corporation of Japan having a number average molecular weight of about 6300 g/mole and a melting point of about 200° C.

NCP-200—A polysilazane polymer available from the Chisso Corporation of Japan having a number average molecular weight of about 1300 g/mole and a melting point of about 100° C.

PCS—A polycarbosilane preceramic polymer available from Nippon Carbon Company of Japan (U.S. distribution Dow Chemical Company) having a number average molecular weight of about 2000 g/mole and a melting point of about 100° C.

PSS—A polysilastyrene preceramic polymer available from Nippon Soda Corporation of Japan under the designation "Polysilastyrene -120", having a number average molecular weight of about 2000 g/mole and a melting pointing of about 200° C.

In Examples 1 to 11, the preceramic polymer and indicated amount of Al(AcAc)$_3$ as shown in Table 1 were pyrolyzed as follows to produce Si—Al—O—N ceramic compositions.

EXAMPLES 1 to 11

Starting samples of preceramic polymer and Al(AcAc)$_3$ as shown in Table 1 were prepared by grinding the mixture in an agate mortar and pestle. After grinding, each starting sample was placed in a separate aluminum oxide boat and inserted in the steel liner of a heat treating furnace, and purged with flowing ammonia at a flow rate of 300 cc/min for about 30 minutes. The starting materials were then heated in flowing ammonia gas to a final temperature $T_{max}$ of 700° C. The general time-temperature sequence used, after purging with ammonia, was as follows. The furnace was heated under ammonia at a flow rate of 300 cc/min to 200° C. in 60 minutes, held at 200° C. for 240 minutes, heated to 300° C. in 120 minutes, held at 300° C. for 300 minutes, and heated to 400° C. in 120 minutes, held at 400° C. for 300 minutes, and heated to 500° C. in 120 minutes. The sample was held at 500° C. for 120 minutes, followed by gradual heating from 500° C. to 700° C. in 120 minutes, and held at 700° C. for 120 minutes before cooling to room temperature.

The resulting ceramic product in each case was weighed and a nitrogen absorption isotherm was determined, and analyzed by the BET method to obtain the surface area, and by the t-plot method to obtain the micropore volume and meso/micro surface area. The ceramic product weight, micropore volume (MP vol.), total surface area (SA), surface area due to mesopores or macro-surface area (Meso SA) and final metal content, where determined, for each sample are listed in Table 1. The surface area associated with microporosity is approximately equal to the difference in column 6 and column 7. In all cases, the samples exhibited a Type 1 nitrogen adsorption isotherm and significant micropore volume. Metal content in the final ceramic product was determined by X-ray Fluorescence (XRF) methods.

Ceramics produced in accordance with Examples 1 to 11 exhibit a high micropore volume, acidic and polar functionality and membranes prepared therefrom are useful in reactive and non-reactive separation applications.

TABLE 1

| | | | Data For Examples 1 to 11 | | | | | |
|---|---|---|---|---|---|---|---|---|
| Sample # | Example # | PCP % metal cmpd. | | Start gm | Final cer gm | Tot. SA m$^2$/gm | Meso SA m$^2$/gm | MP vol. cm$^3$/gm | Final metal content |
| D 50-1 | 1 | NCP-200 | 3.0 | 2.1 | 637 | 23 | .2421 | 1.13% Al |
|  |  | Al(AcAc)$_3$ | 0.5 |  |  |  |  |  |
| JB 3-2 | 2 | NCP-200 | 6.0 | 4.3 | 414 | 33 | .1572 | 0.43% Al |
|  |  | Al(AcAc)$_3$ | 0.5 |  |  |  |  |  |
| JB 3-3 | 3 | NCP-200 | 6.0 | 4.46 | 503.5 | 46 | .1875 | 0.67% Al |
|  |  | Al(AcAc)$_3$ | 1.0 |  |  |  |  |  |

TABLE 1-continued

Data For Examples 1 to 11

| Sample # | Example # | PCP % metal cmpd. | Start gm | Final cer gm | Tot. SA m²/gm | Meso SA m²/gm | MP vol. cm³/gm | Final metal content |
|---|---|---|---|---|---|---|---|---|
| JB 3-4 | 4 | NCP-200 Al(AcAc)₃ | 6.0 1.5 | 4.67 | 521.5 | 46 | .1944 | 1.21% Al |
| JA 18-4 | 5 | NCP-200 Al(AcAc)₃ | 6.12 3.00 | 4.19 | 508 | 42 | .1805 | 0.78% Al |
| JA 18-5 | 6 | NCP-200 Al(AcAc)₃ | 6.02 6.00 | 5.79 | 454 | 46 | .1665 | 2.82% Al |
| JA 18-6 | 7 | NCP-200 Al(AcAc)₃ | 3.0 6.1 | 3.35 | 464.6 | 37 | .1727 | 5.3% Al |
| D 50-2 | 8 | PCS Al(AcAc)₃ | 3.0 0.5 | 2.5 | 314 | 17 | .1165 | 0.75% Al |
| JA 18-2 | 9 | PCS Al(AcAc)₃ | 6.0 1.05 | 4.79 | 305.5 | 24 | .1090 | 0.95% Al |
| D 50-3 | 10 | PSS-120 Al(AcAc)₃ | 3.0 0.5 | 1.8 | 542 | 19 | .2052 | 1.77% Al |
| JA 18-3 | 11 | PSS-120 Al(AcAc)₃ | 6.06 1.04 | 3.61 | 511.5 | 46 | .1810 | 1.19% Al |

EXAMPLES 12 to 20

In the following examples, ceramic products containing typical catalytic metals (Cu, Ni, Co, Pd and Pt) were prepared by the process of Examples 1 to 11 using beta-diketonates as the organometallic additives. Data for these examples is shown in Table 2.

TABLE 2

| Sample # | Example # | PCP % metal cmpd. | Start gm | Final cer gm | Tot. SA m²/gm | Meso SA m²/gm | MP vol. cm³/gm | Final metal content |
|---|---|---|---|---|---|---|---|---|
| D 50-4 | 12 | NCP-200 Ni(AcAc)₂ | 3 0.5 | 2.06 | 273 | 11 | .1035 | 3.8% Ni |
| JA 17-3 | 13 | NCP-200 Ni(AcAc)₂ | 6.0 1.0 | 4.43 | 296.5 | 24 | .1070 | 4.21% Ni |
| D 50-5 | 14 | NCP-200 Cu(AcAc)₂ | 3 0.5 | 2.53 | 298 | 13 | .1099 | 4.4% Cu |
| JA 17-2 | 15 | NCP-200 Cu(AcAc)₂ | 6.01 1.05 | 4.97 | 296 | 24 | .1077 | 3.39% Cu |
| JA 16-2 | 16 | NCP-200 Co(AcAc)₂ | 6.07 1.1 | 4.73 | 402.5 | 22 | .1460 | 2.93% Co |
| D 50-6 | 17 | NCP-200 Co(AcAc)₂ | 3 0.5 | 2.45 | 293 | 12 | .1109 | 2.3% Co |
| D 50-9 | 18 | NCP-200 Pt(AcAc)₂ | 3 0.5 | 2.84 | 50 | 20 | .0146 | 6.6% Pt |
| JA 17-4 | 19 | NCP-200 Pt(AcAc)₂ | 6 1 | 5.83 | 224.3 | 24 | .0793 | 4.4% Pt |
| JA 17-5 | 20 | NCP-200 Pd(AcAc)₂ | 6.02 1.03 | 4.95 | 275.7 | 28 | .1020 | 5.5% Pd |

Ceramics produced in accordance with Examples 12 to 20 exhibited M—C—N nanophases (XRD) where M is the metal incorporated into the ceramic structure. These nanoporous ceramics have both catalytic and polar functionality and membranes produced therefrom are useful in reactive and non-reactive separations.

EXAMPLES 21 to 33

In the following examples, ceramic products prepared using organometallics of reactive transition metals such as Fe, V, Mo and W were prepared by the process set forth in Examples 1 to 11. Data is shown in Table 3.

TABLE 3

| Sample # | Example # | PCP % metal cmpd. | Start gm | Final cer gm | Tot. SA m²/gm | Meso SA m²/gm | MP vol. cm³/gm | Final metal content |
|---|---|---|---|---|---|---|---|---|
| JA3-2 | 21 | NCP-200 Fe(AcAc)₃ | 6 1 | 4.37 | 321.4 | 37 | .1190 | 4.08% Fe |
| D-50-8 | 22 | NCP-200 Vo(AcAc)₂ | 3 0.5 | 2.61 | 284 | 13 | .1074 | 2.48% V |
| JA4-3 | 23 | NCP-200 Vo(AcAc)₂ | 6 1 | 5.05 | 375 | 27 | .1459 | 2.79% V |
| JA4-2 | 24 | NCP-200 V(AcAc)₃ | 6 1 | 5.00 | 374 | 26 | .1428 | 3.51% V |
| JA16-3 | 25 | NCP-200 Fe(Cpdac)₂ | 6.1 1 | 4.13 | 377 | 21 | .1369 | 0.41% Fe |
| JB4-2 | 26 | NCP-200 Mo(CO)₆ | 6.1 1.1 | 3.62 | 276.4 | 30 | .1012 | 2.23% Mo |
| Ja11-2 | 27 | NCP-200 Mo(CO)₆ | 6.0 0.26 | 3.62 | 276.7 | 70.2 | .0829 | 1.26% Mo |
| JA11-3 | 28 | NCP-200 Mo(CO)₆ | 6.2 1.0 | 3.91 | 196 | 43 | .0613 | 2.7% Mo |
| JA11-4 | 29 | NCP-200 Mo(CO)₆ | 6.0 3.0 | 4.26 | 298 | 47 | .0999 | 6.0% Mo |
| JA11-5 | 30 | NCP-200 Mo(CO)₆ | 6.0 6.1 | 4.58 | 306 | 53 | .1026 | 3.38% Mo |
| JB4-3 | 31 | NCP-200 W(CO)₆ | 6.1 1.1 | 4.13 | 308.5 | 27 | .1158 | 1.13% W |
| JA6-2 | 32 | NCP-200 Vo(AcAc)₂ Al(AcAc)₃ | 6.1 1.0 1.0 | 5.36 | 473 | 41 | .1825 | 3.69% V 0.87% Al |
| JA6-3 | 33 | NCP-200 V(AcAc)₃ Al(AcAc)₃ | 6.0 1.0 1.0 | 5.25 | 477 | 38 | .1851 | 2.54% V 0.64% Al |

*Fe(Cpdac)₂ is the ferric salt of cyclopentadiene carboxylic acid.

Ceramics produced in accordance with Examples 21 to 33 also exhibited M—C—N nanophases. These nanoporous ceramics also have both catalytic and polar functionality and membranes produced therefrom are useful in reactive and non-reactive separations.

EXAMPLES 34 to 47

In the following examples, ceramic products prepared using organometallics of Group II (Mg), Group III (Ga), Group IV (Ti, Zr) and certain rare earth metals were prepared by the process of Examples 1 to 11. Data is shown in Table 4.

Ceramics produced in accordance with Examples 34 to 47 have both acidic and polar functionalities as well as excellent thermodynamic stability. Membranes produced therefrom are useful in reactive and non-reactive separations.

TABLE 4

| Sample # | Example # | PCP % metal cmpd. | Start gm | Final cer gm | Tot. SA m²/gm | Meso SA m²/gm | MP vol. cm³/gm | Final metal content |
|---|---|---|---|---|---|---|---|---|
| JA13-1 | 34 | NCP-200 Mg(AcAc)₂ | 6 1 | 4.39 | 370.5 | 22 | .1343 | 2.09% Mg |
| JA7-2 | 35 | NCP-200 Ga(AcAc)₃ | 6 1 | 5.11 | 423.2 | 34 | .1611 | 4.5% Ga |
| JA8-2 | 36 | NCP-200 Zr(AcAc)₄ | 6.1 1 | 4.73 | 327.6 | 27 | .1249 | 4.9% Zr |
| JA8-3 | 37 | NCP-200 TiO(AcAc)₂ | 6.1 1 | 5.13 | 282.7 | 32 | .1041 | 3.0% Ti |
| JA8-4 | 38 | NCP-200 Ce(tmhd)₄* | 6.1 1 | 4.73 | 261.4 | 35 | .0947 | 4.8% Ce |
| JA7-5 | 39 | NCP-200 La(tmhd)₃ | 6 1.2 | 4.74 | 320.7 | 25 | .1249 | 1.07% La |
| JA8-4 | 40 | NCP-200 Ce(tmhd)₄ | 6.1 1 | 4.73 | 261.4 | 35 | .0947 | 4.8% Ce |
| JA12-4 | 41 | NCP-200 Sm(tmhd)₃ | 6 1 | 4.81 | 266 | 21 | .0948 | 11.1% Sm |
| JA12-3 | 42 | NCP-200 Eu(tmhd)₃ | 6 1 | 4.53 | 353 | 21 | .1287 | 5.7% Eu |
| JA7-4 | 43 | NCP-200 Gd(tmhd)₃ | 6 1 | 4.63 | 324.1 | 22 | .1253 | 5.8% Gd |
| JA7-3 | 44 | NCP-200 Y(tmhd)₃ | 6.1 1 | 4.60 | 334.8 | 24 | .1290 | 2.74% Y |

TABLE 4-continued

| Sample # | Example # | PCP % metal cmpd. | Start gm | Final cer gm | Tot. SA m²/gm | Meso SA m²/gm | MP vol. cm³/gm | Final metal content |
|---|---|---|---|---|---|---|---|---|
| JA13-2 | 45 | NCP-200 Tb(tmhd)$_3$ | 6 0.9 | 4.65 | 359.5 | 21 | .1334 | 7.4% Tb |
| JA13-3 | 46 | NCP-200 Yb(tmhd)$_3$ | 6.1 1 | 4.47 | 371.7 | 22 | .1331 | 5.7% Yb |
| JA12-2 | 47 | NCP-200 Tm(tmhd)$_3$ | 6 1 | 4.55 | 348.9 | 23 | .1271 | 7.1% Tm |

*H(tmhd) is tetramethylheptanedione

EXAMPLES 48–55

In the following examples 48–53, ceramic products containing a tetra-ammonium alkyl exchanged clay (TAACLAY) from Southern Clay Products as the organometallic source were prepared by the process of Examples 1 to 11, except that helium gas was substituted for ammonia gas in Examples 52 and 53. Examples 54 and 55 demonstrate that microporosity can also be achieved where the combination of NCP-200 and Al(AcAc)$_3$ and the combination of NCP-200 and a polyalazane polymer respectively are pyrolyzed by the same process using inert helium gas. Data is shown in Table 5.

TABLE 5

| Sample # | Example # (gas) | PCP % metal cmpd. | Start gm | Final cer gm | Tot. SA m²/gm | Meso SA m²/gm | MP vol. cm³/gm | Final metal content |
|---|---|---|---|---|---|---|---|---|
| JA5-2 | 48 (NH$_3$) | NCP-200 TAACLAY | 5.4 0.3 | 3.79 | 355.1 | 29 | .1338 | 0.31% Mg 0.10% Na |
| JA5-3 | 49 (NH$_3$) | NCP-200 TAACLAY | 5.4 0.6 | 4.25 | 237.8 | 19 | .0898 | 0.50% Mg 0.16% Na |
| JA5-4 | 50 (NH$_3$) | NCP-200 TAACLAY | 5.4 1.1 | 4.66 | 245.5 | 18 | .0927 | 0.10% Mg 0.03% Na |
| D54-2 | 51 (NH$_3$) | NCP-200 TAACLAY | 1.5 1.5 | 1.88 | 345 | 145 | .0919 | 6.8% Mg |
| D55-1 | 52 (He) | NCP-200 TAACLAY | 2.7 0.3 | 2.12 | 25 | 22 | 0 | 1.4% Mg |
| D55-2 | 53 (He) | NCP-200 TAACLAY | 2.7 1.3 | 2.02 | 214 | 26 | .0873 | 7.2% Mg |
| JA20-2 | 54 (He) | NCP-200 Al(AcAc)$_3$ | 6.0 1.0 | 4.84 | 215 | 12 | .0912 | — — |
| JA20-3 | 55 (He) | NCP-200 PALZ* | 6.1 1.1 | 4.52 | 84 | 19 | 0.0345 | — |

*PALZ- a polyalazane polymer having recurring units of the structure R—Al—N—R$^1$ wherein R and R$^1$ are the same or different C$_1$–C$_4$ alkyl groups, molecular weight 1500–2000, sold by Lanxide Corp., Newark, Del. under the trade name CERASET-AN.

EXAMPLE 56

A poly(isobutylaluminoxane) polymer having recurring groups of the general structure (RAlO)$_x$ where R is (CH$_3$)$_2$CHCH$_2$— was prepared by the partial hydrolysis of triisobutyl aluminum in accordance with the process of Example 1 of U.S. Pat. No. 4,857,492. The polymer was then dissolved in methylcyclohexane solvent also containing dissolved NCP-100 polysilazane polymer such that the respective weight ratios were 1.0 to 0.6. Evaporation of the solvent yielded a dry solid mixture. One gram of the solid mixture was placed in an alumina boat inside a 1 inch quartz furnace tube and the tube was purged with argon gas for 10 minutes. The same was then gradually heated under argon gas to 650° C. by the general process of Examples 1–11, held at that temperature for one hour and then cooled under flowing argon to room temperature.

Surface area analysis was as follows:

| TOT SA (m²/gm) | Meso/SA (m²/gm) |
|---|---|
| 508 | 55 |

What is claimed is:

1. A preceramic composite intermediate composition comprising a mixture of a ceramic precursor oligomer or polymer having a number average molecular weight in the range of from about 200 to about 100,000 g/mole having uniformly dispersed therein from about 0.5 up to about 65 wt % of an organometallic compound containing a metal of Group IB, II, III, IV, V, VIB, VIIA or VIII of the Periodic Table, including rare earth metals.

2. The composition of claim 1 wherein said ceramic precursor is selected from the group consisting of polysilazanes, polysiloxazanes, polycarbosilazanes, perhydropoly-silazanes, polycarbosilanes, vinylic polysilanes, amine boranes, polyphenylborazones, carboranesiloxanes, polysilastyrenes, polytitanocarbosilanes and mixtures thereof.

3. The composition of claim 2 wherein said ceramic precursor comprises a polysilazane.

4. The composition of claim 2 wherein said ceramic precursor comprises a polycarbosilane.

5. The composition of claim 2 wherein said ceramic precursor comprises a polysilastyrene.

6. The composition of claim 1 which contains from about 75 to about 99 parts by weight of said ceramic precursor and from about 1 to about 35 parts by weight of said organometallic compound.

7. The composition of claim 1 wherein said organometallic compound is selected from the group consisting of metal carbonyls, metal salts of organic or inorganic acids, metal chelates with organic ligands, organic solvent dispersible metal silicate-containing clay and metal-containing polymers.

8. The composition of claim 7 wherein said organometallic compound is a metal chelate of a beta-diketone.

9. The composition of claim 8 wherein said beta diketone is acetylacetone.

10. The composition of claim 7 wherein said organometallic compound is a metal carbonyl.

11. The composition of claim 10 wherein said carbonyl is a rare earth metal carbonyl.

12. The composition of claim 7 wherein said organometallic compound is a tetra-ammonium alkyl exchanged clay.

13. The composition of claim 7 wherein said organometallic compound is an aluminoxane or polyalazane polymer.

14. The composition of claim 1 wherein said organometallic compound contains a metal selected from the group consisting of Pt, Pd, Rh, Re, Ru, Fe, Ni, Cu, Co, Ag, Al and Ga.

15. The composition of claim 1 wherein said organometallic compound contains a metal selected from the group consisting of Ti, Zr, Hf, V, Nb, Ta, Cr, Mo, W, Y and rare earth metals.

16. The composition of claim 15 wherein said organometallic compound contains a rare earth metal.

17. A process for preparing a nanoporous ceramic product having catalytic properties and having a surface area in excess of 70 m$^2$/gm and a volume of open-pore micropores, which have a mean diameter of less than 20 Angstroms, of greater than about 0.03 cm$^3$/gm, comprising:
   a. forming an intimate mixture comprising a ceramic precursor oligomer or polymer having a number average molecular weight in the range of from about 200 to about 100,000 g/mole and from about 0.5 to about 65% by weight of an organometallic compound containing a metal of Group IB, II, III, IV, V, VIB, VIIA, or VIII of the Periodic Table, including rare earth metals;
   b. gradually heating said mixture in the presence of ammonia or an inert gas, with optional sequential stages with hold times at intermediate temperatures, to a maximum temperature in the range of from about 300° C. up to less than 1100° C. and over a period of total combined heating and optional hold time of from about 3 to about 50 hours to form said microporous ceramic product; and
   c. gradually cooling said nanoporous ceramic product.

18. The process of claim 17 wherein said ceramic precursor is selected from the group consisting of polysilazanes, polysiloxazanes, polycarbosilazanes, perhydropoly-silazanes, polycarbosilanes, vinylic polysilanes, amine boranes, polyphenylborazones, carboranesiloxanes, polysilastyrenes, polytitanocarbosilanes and mixtures thereof.

19. The process of claim 18 wherein said ceramic precursor comprises a polysilazane.

20. The process of claim 18 wherein said ceramic precursor comprises a polycarbosilane.

21. The process of claim 18 wherein said ceramic precursor comprises a polysilastyrene.

22. The process of claim 17 wherein said mixture contains from about 75 to about 99 parts by weight of said ceramic precursor and from about 1 to about 35 parts by weight of said organometallic compound.

23. The process of claim 17 wherein said organometallic compound is selected from the group consisting of metal carbonyls, metal salts of organic or inorganic acids metal chelates with organic ligands, organic solvent dispersible metal silicate—containing clay and metal-containing polymers.

24. The process of claim 23 wherein said organometallic compound is a metal chelate of a beta-diketone.

25. The process of claim 24 wherein said beta diketone is acetylacetone.

26. The process of claim 23 wherein said organometallic compound is a metal carbonyl.

27. The process of claim 26 wherein said carbonyl is a rare earth metal carbonyl.

28. The process of claim 23 wherein said organometallic compound is a tetra-ammonium alkyl exchanged clay.

29. The process of claim 23 wherein said organometallic compound is an aluminoxane or polyalazane polymer.

30. The process of claim 17 wherein said organometallic compound contains a metal selected from the group consisting of Pt, Pd, Rh, Re, Ru, Fe, Ni, Cu, Co, Ag, Al and Ga.

31. The process of claim 17 wherein said organometallic compound contains a metal selected from the group consisting of Ti, Zr, Hf, V, Nb, Ta, Cr, Mo, W, Y and rare earth metals.

32. The process of claim 31 wherein said organometallic compound contains a rare earth metal.

33. The process of claim 17 wherein said intimate mixture is formed by forming a solution of said ceramic precursor and said organometallic compound in an organic solvent, and removing said solvent.

34. The process of claim 17 wherein said intimate mixture is formed by heating a mixture of said ceramic precursor and said organometallic compound to a temperature up to about 250° C. to form a melt mixture.

35. The process of claim 17 wherein said heating is conducted in the presence of ammonia gas.

36. The process of claim 17 wherein said mixture is heated to a maximum temperature ($T_{max}$) in the range of from about 400° C. up to less than 1100° C., said heating characterized by a rate of temperature increase between about 300° C. to 600° C., or between about 300° C. to $T_{max}$ where $T_{max}$ is less than 600° C. of less than about 5° C. per minute.

37. The process of claim 36 wherein $T_{max}$ ranges from about 400° C. to 1000° C.

38. The process of claim 37 wherein $T_{max}$ ranges from about 500° C. and 750°.

39. The process of claim 17 wherein said nanoporous ceramic product has a pore structure wherein the pores have a mean width of up to about 100 Angstroms.

40. A nanoporous ceramic product having a surface area in excess of 70 m$^2$/gm and a volume of open-pore micropores, which have a mean width of less than 20 Angstroms, of greater than about 0.03 cm$^3$/gm, said product prepared by the process of claim 17.

41. The ceramic product of claim 40 having a surface area in excess of about 100 m$^2$/gm.

42. The ceramic product of claim 41 having a surface area in excess of about 200 m$^2$/gm and a micropore volume of greater than about 0.08 cm$^3$/gm.

43. The ceramic product of claim 40 in the form of a thin membrane.

44. The ceramic product of claim 40 containing from about 0.1 up to about 10% by weight of metal.

* * * * *